(12) United States Patent
Hong

(10) Patent No.: US 6,754,550 B2
(45) Date of Patent: Jun. 22, 2004

(54) TOLERANCED DIGITIZING METHOD

(75) Inventor: Jiawei Hong, New York, NY (US)

(73) Assignee: Hurco Companies, Inc., Indianapolis, IN (US)

(*) Notice: Subject to any disclaimer, the term of this patent is extended or adjusted under 35 U.S.C. 154(b) by 182 days.

(21) Appl. No.: 10/045,289

(22) Filed: Oct. 18, 2001

(65) Prior Publication Data

US 2003/0083764 A1 May 1, 2003

(51) Int. Cl.[7] ............................................. G06F 19/00
(52) U.S. Cl. ........................................ 700/98; 702/168
(58) Field of Search ........................... 700/98, 159, 160, 700/161, 186, 187, 192, 252; 382/154; 341/5; 702/94, 95, 155, 157, 158, 168; 356/625; 703/2

(56) References Cited

U.S. PATENT DOCUMENTS 4,589,062 A * 5/1986 Kishi et al. ................. 700/187
4,648,024 A * 3/1987 Kato et al. .................. 700/187
5,334,918 A * 8/1994 McMurtry et al. ...... 318/568.16
6,161,079 A   12/2000 Zink et al.

FOREIGN PATENT DOCUMENTS

EP            1130353 A2     9/2001

OTHER PUBLICATIONS

Copy of International Search Report for International Application No. US02/33185 completed on Mar. 4, 2003.

* cited by examiner

Primary Examiner—Leo Picard
Assistant Examiner—Carlos R. Ortiz
(74) Attorney, Agent, or Firm—Baker & Daniels

(57) ABSTRACT

A method of routing a probe of a digitizing system on the surface of a model object for the purpose of copying that model object as a part are disclosed. When a tolerance number is given, model surface data can be collected so that the geometrical difference between the model and the part is within the given tolerance for all touchable points on the model surface.

13 Claims, 7 Drawing Sheets

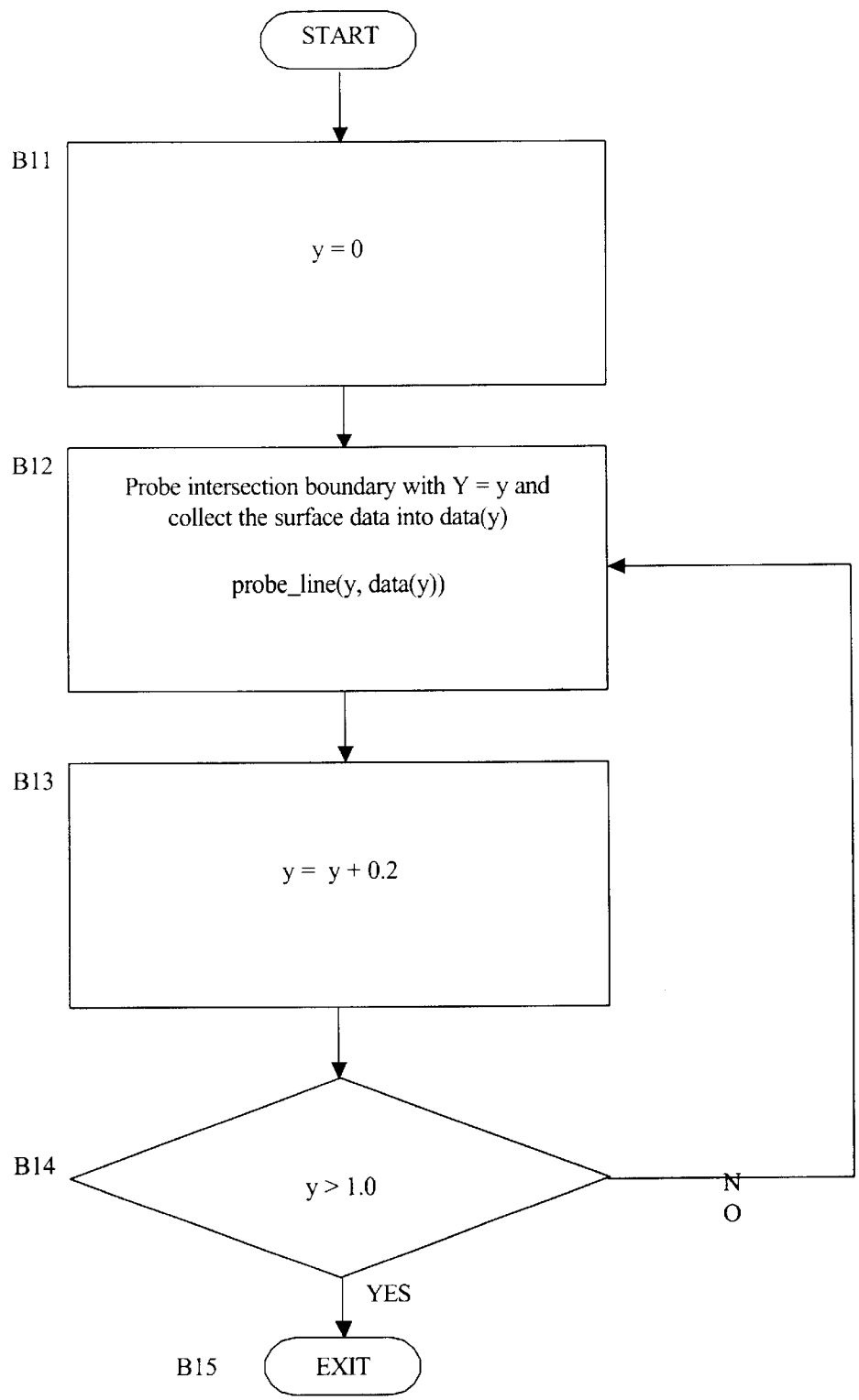
Fig. 2.1 (PRIOR ART)

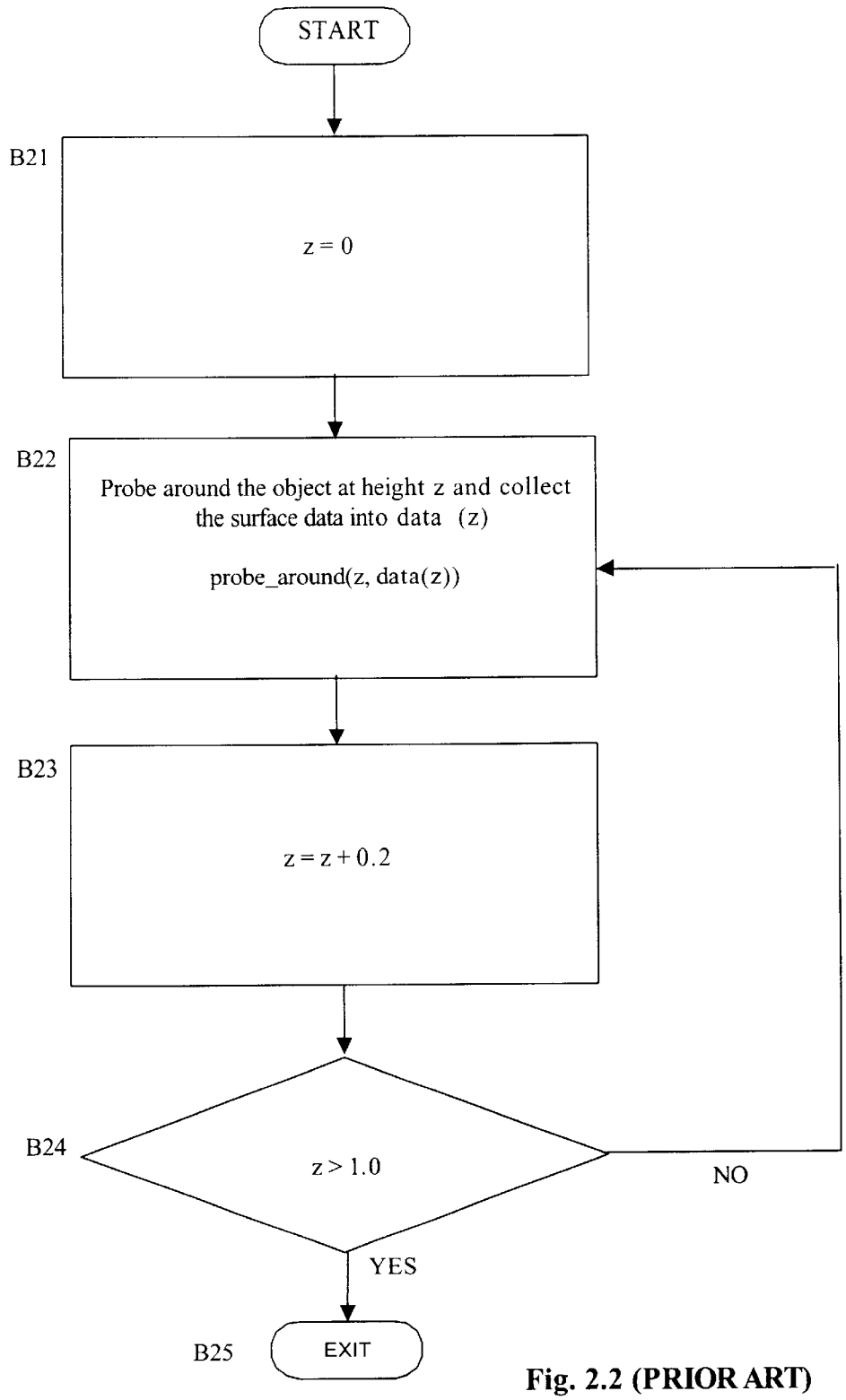
Fig. 2.2 (PRIOR ART)

TOLERANCED DIGITIZING METHOD

BACKGROUND INFORMATION

Digitizing is the process where by position data is gathered from the surface of a physical model object with the aim of reconstructing one or more duplicates of the model object. A conventional digitizing system is a data collection device by which surface points on a physical model may be collected. This data ("Digitized Data") is then used to produce a physical duplicate of the model object. This is achieved by using the Digitized Data to generate Computer Numerical Control ("CNC") part program, which may be executed on a machine tool. The objective of the digitizing process is to efficiently capture sufficient data to faithfully reproduce the model object.

A conventional digitizing system may consist of an actuated machine, a controller, and a digitizing probe that are employed to collect data representative of points on the surface of the model object. The machine may also consist of a table on which a model object is placed and a head for mounting the data gathering probe. Relative motion between the probe and the model object is achieved when the controller generates control signals to the machine's actuators (e.g., servomotors). The controller orchestrates the relative motion between the probe and the model object by processing feedback information from the machine's actuators and by processing the output signals from the data-gathering probe. The motions of the actuated machine may be, for example, orthogonal three-dimensional motions. Those skilled in the art will understand that systems may implement more or fewer axes of controllable motion. The feedback generated by the actuated axes may, for example, be in the form of encoder feedback indicating the relative displacement of each axis of motion from a known reference point.

SUMMARY OF THE INVENTION

The present invention relates to a method of routing a probe of a digitizing system on the surface of a model object for the purpose of copying that model object as a part are disclosed. When a tolerance number is given, model surface data can be collected so that the geometrical difference between the model and the part is within the given tolerance for all touchable points on the model surface.

BRIEF DESCRIPTION OF DRAWINGS

FIG. 2.1 shows an exemplary flow diagram for a conventional line digitizing method.

FIG. 2.2 shows an exemplary flow diagram for a conventional rotation digitizing method.

DETAILED DESCRIPTION

Figure 1:
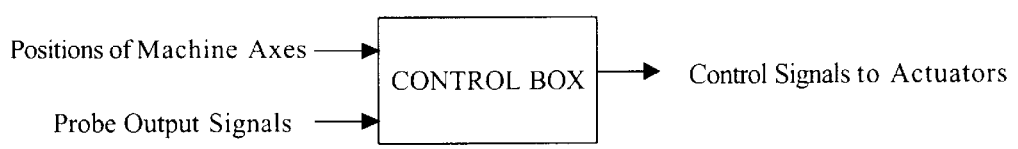
FIG. 1 shows an exemplary diagram of a conventional digitizing system.

The present invention may be further understood with reference to the following description of preferred exemplary embodiments and the related appended drawings, wherein like elements are provided with the same reference numerals.

A conventional digitizing system usually includes a table on which the model object may be mounted for relative movement along the axes of an XYZ Cartesian coordinate system between the model object and a head on which a probe is mounted. The probe is a precision sensor capable of generating output signals indicative of surface points from a model object. In its simplest form, i.e., a touch trigger probe, the output signal is binary (i.e., either "ON" or "OFF"). A touch trigger probe has a stylus which consists of a slender rod with a spherical ball affixed to one end. The touch trigger probe is connected to a highly sensitive displacement switch. Therefore, when the ball of the stylus comes in contact with the surface, the probe generates an "ON" output signal. When the probe is no longer in contact with the surface, an "OFF" output signal is generated. By combining the output signal of the touch trigger probe with the machine feedback, the controller generates and stores coordinate values that are representative of an associate surface point on the model object.

FIG. 1 shows an exemplary diagram of a conventional digitizing system. The digitizing system is controlled by a computer (or "control box"), which monitors the positions of the encoders of the XYZ axes and the probe output signals. In addition, while the control box computes and sends motion control signals to motors on the XYZ axes so that the probe stylus may move along the model surface according to a routing algorithm, the contacting positions are recorded. Later, if a CNC program is formed by transferring this position data to a program to run a CNC machine using a spherical tool with the same diameter as the probe stylus, a part similar to the model may be obtained.

The digitizing process may be broken down into two parts: Data Gathering and Digitizing Approach. Data Gathering details the method used by the controller to generate points representative of the surface of the model object within a finite region, typically the curve formed at the intersection of the surface of the model object with a plane. The data gathered during this step is referred to as a Pass Data Set and may be represented as:

data(Pass_Id)

The function data( ) is the Pass Data Set and Pass_Id is an identifier that refers to the data collected (i.e., the definition of the intersecting plane).

The selection of an appropriate Data Gathering method is dependent on many factors including the machine and the probe. For example, the Data Gathering method described in U.S. Pat. No. 6,052,628 is particularly suited for use with a three-axis touch trigger probe digitizing system, though other methods may also be employed to carry out the task of Data Gathering. Those skilled in the art will be able to select an appropriate Data Gathering method.

The Digitized Approach initiates multiple Data Gathering passes to collect data that is representative of the model object, i.e., the Digitized Data. The Digitizing Approach defines the method which is utilized to determine where the instances of the Data Gathering are performed such that the collection of the Pass Data Sets is enough to faithfully reproduce the model object.

A common Digitizing Approach uses a set of cross-sections obtained by intersecting the model object with a set of predetermined mutually parallel and equally distanced virtual planes. The computer controls the stylus motion so that the probe traces along each of the virtual plane-model object intersection boundaries in turn. Along each intersection boundary a sequence of points representing the intersection boundary curve, i.e., the Pass Data Set, is gathered yielding the Digitized Data. If the normal direction of the intersection planes is perpendicular to the Z-axis, the method is referred to as a Line Digitizing Approach. FIG. 2.1 shows an exemplary flow diagram of a program utilizing Line Digitizing Approach. On the other hand, if the normal direction of the set of planes is parallel to the Z-axis, the method is referred to as a Rotational Digitizing Approach. FIG. 2.2 shows an exemplary flow diagram of a program utilizing Rotational Digitizing Approach.

The Line Digitizing Approach may be expressed in shorthand notation as:

probe_line(Plane_Id, data(Plane_Id))

The probe_line( ) function represents the Line Digitizing Approach. Plane_Id identifies the desired data-gathering plane and data(Plane_Id) identifies the Pass Data Set as described above.

The Rotational Digitizing Approach may be expressed in shorthand notation as:

probe_around(Plane_Id, data(Plane_Id))

The probe_around( ) function represents the Rotational Digitizing Approach. Plane_Id identifies the desired data-gathering plane and data(Plane_Id) identifies the Pass Data Set as described above.

For example, a model of the shorthand notation may describe a model object that is a 2-inch sphere cut in half and placed on the table such that the semi-sphere's center is coincident with the machine's (0, 1, 0) reference point. It may be desired to gather data using the Line Digitizing Approach along the intersection boundary formed by the Y virtual plane with value y=1, i.e., the plane bisecting the semi-sphere. This notation may be expressed in shorthand form as:

probe_line(1.0, data(1.0))

Again, the probe_line( ) function represents the Line Digitizing Approach. Plane_Id was replaced by an expression identifying the desired plane, i.e., y=1.0 in this current example. The function data(Plane_Id) was replaced by data(Pass_Id) with a Pass_Id of y=1.0 identifying the data from this plane.

As mentioned above, FIG. 2.1 shows a flow diagram of a program utilizing Line Digitizing Approach starting with a virtual plane of y=0 and successive virtual planes having a 0.2 inch positive displacement until the Digitized Data in the region between y=0 and y=1.0 have been gathered. The flow diagram assigns a virtual plane of y=0 at B11, and then at B12 executes probe_line(y, data(y)). This digitizes a curve on the boundary of the intersection of the object model in the XZ plane with Y coordinate equal to y, and stores the Pass Data Set in data(y). At B13, y is increased by a constant, 0.2 in this example, specifying the location of the next virtual plane. B14 checks whether y is greater than the exit condition, 1.0 in the present example. If not, this newly computed virtual plane is used for data collection as indicated by the revisiting of step B12. If the y-coordinate of the virtual plane is greater than 1.0, the flow diagram proceeds to B15 and is finished.

Similarly, FIG. 2.2 shows a flow diagram of a Rotational Digitizing Approach The shorthand notation of probe_around(z, data(z)) directs the probing of the boundary of the planar section in the XY plane with Z-coordinate equal to a constant z and stores the collected surface position data in data(z). The flow diagram assigns 0 to z at B21, and then at B22 executes probe_around(z, data(z)). This digitizes a curve on the boundary of the section of the model in the XY plane with Z-coordinate equal to z, and stores the collected data in data(z). At B23, z is increased by a constant 0.2. B24 checks whether z is greater than 1.0, the exit condition. If not, the process continues to B22 and repeats the steps until the exit condition is met, at which it proceeds to B25.

Figure 3:
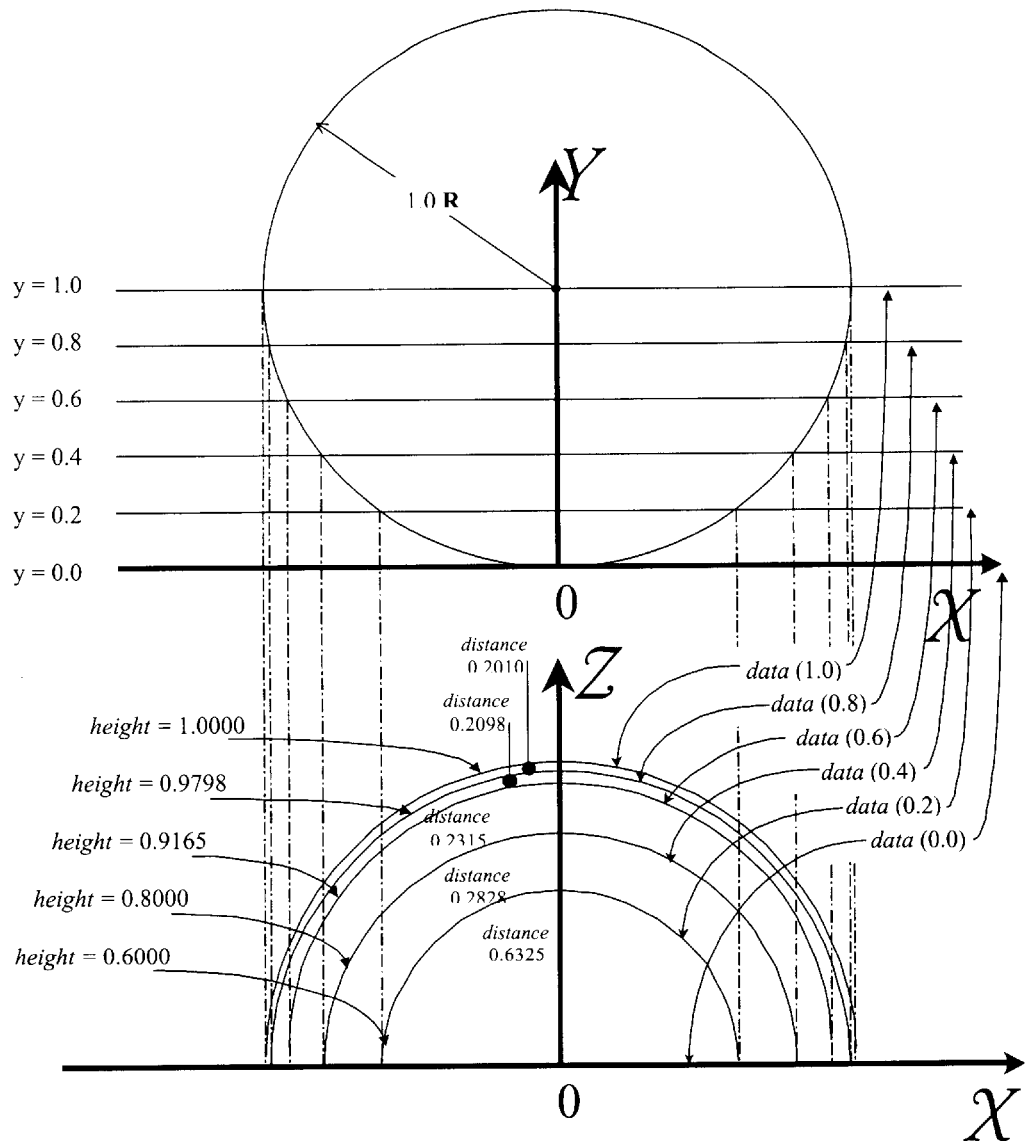
FIG. 3 shows the exemplary results of a conventional line digitizing method.

The exemplary flow diagram shown in FIG. 2.1 will generate six curves at the sections with y=0.0, 0.2, 0.4, 0.6, 0.8, and 1.0. The six curves are stored in data(0.0), data(0.2), data(0.4), data(0.6), data(0.8) and data(1.0), respectively. If the model is the same half sphere of the previous example, centered at (0.0, 1.0, 0.0) with a radius of 1.0, the six curves generated using the flow diagram of FIG. 2.1 are illustrated in FIG. 3. FIG. 3 depicting both a top and side view is representative of the current art of digitizing. The curves have a height of 0.000, 0.8000, 0.9165, 0.9798, and 1.000, respectively. The resulting distance between the six curves are 0.6325 (between data(0.0) and data(0.2)), 0.2828 (between data(0.2) and data(0.4)), 0.2315 (between data (0.4) and data(0.6), 0.2098 between data(0.6) and data(0.8)), and 0.2010 (between data(0.8) and data(1.0)).

A short coming of this approach is that despite the appearance of uniform spacing of the sequential Pass Data Sets when viewed from above, i.e., data(0.0) through data (1.0) in the above example, the use of equidistance virtual planes results in the non- uniform and unbounded 3-Dimensional ("3D") spacing between the Pass Data Sets. Essentially, the maximum distance between any two adjacent Pass Data Sets is uncontrolled. For example, in FIG. 3, the distance between the Pass Data sets varies from a minimum value of 0.2010 (between data (0.8) and data (1.0)) and has a maximum value of 0.6325 (between data (0.0) and data(0.2)). The maximum distance between two adjacent Pass Data Sets is a measure of how accurately the Digitizing Data, captured the details of the model object's surface. By computing the distance between adjacent Pass Data Sets, the notion of quality of the Digitized Data may be introduced. As the distance between adjacent Pass Data Sets increases, the fidelity by which the data set captures the model object's essence decreases. This notion of controlled quality is missing in the art of digitizing today.

The present invention relates to an improved Digitizing Approach, Toleranced Digitizing, by which the distance between any two digitized curves (or two adjacent Pass Data Sets) in the 3D space will be smaller than or equal to a predetermined distance.

A physical duplicate object may be machined according to the Digitized Data utilizing a sphere tool with the same diameter as the probe stylus. The tool sequentially visits each of the data points within a Pass Data Set, traversing from one point within the Pass Data Set to the next using straight line segments. When the geometrical difference between the duplicate object and the model object is smaller than or equal to a specified value, E, for all "touchable" surface points then the desired Global Tolerance value ("E") has been achieved. If a duplicate object were superimposed with the model object and a second offset surface from the model object is projected by a distance equal to the value E, all the surface points of the duplicate object are bound by the model object's surface and the offset surface.

"Touchable" surface points includes all points on the model object's surface that may be touched by the probe. A point on the back, under or inside the object model is not touchable, nor is a point inside a very narrow gap that the probe cannot reach. Although the number of collected surface points from any object model is finite, the Global Tolerance is satisfied for the infinitely many touchable points.

To ensure quality, the Global Tolerance E may be determined by the following formula:

$$E=2*(R-\text{sqrt}(R*R-0.25*D*D)). \tag{3.1}$$

Given the Global Tolerance, the maximum allowable distance ("D") between Pass Data Sets may be generated, i.e., D is a function of E. Therefore, solving equation (3.1) for E, results in the equation:

$$D=\text{sqrt}(4*E*R-E*E). \tag{3.2}$$

In equations (3.1) and (3.2), the sqrt( ) function is the mathematical square root function. R is the radius of a probe stylus, and D is the maximum allowable between two adjacent Pass Data Sets in 3D space. For a given Global Tolerance E and a known probe stylus radius R, one may calculate an allowable maximum distance D between two adjacent Pass Data Sets in 3D space.

By controlling the distance between any two adjacent Pass Data Sets to an amount less than D, or by controlling the distance between the adjacent virtual intersection planes to an amount less than E, the Global Tolerance may be controlled to an amount less than E. It is important to compute the maximum distance between two adjacent digitized curves in 3D space controlled to an amount less than D.

For a first Pass Data Set represented by a sequence of points, $data(y_1)=\{P11, P12, \ldots, P1m\}$, and a second Pass Data Set represented by a sequence of points, $data(y_2)=\{P21, P22, \ldots, P2n\}$, the distance between any two points $P1=(x_1, y_1, z_1)$ and $P2=(x_2, y_2, Z_2)$ is given by the following formula:

$$\text{distance}(P1, P2)=\text{sqrt}((x_1-x_2)*(x_1-x_2)+(y_1-y_2)*(y_1-y_2)+(z_1-z_2)*(z_1-z_2)). \tag{3.3}$$

The distance between the point P1 to a sequence of points, $data(y_2)=\{P21, P22, \ldots, P2n\}$ is given by the following formula:

$$\text{distance}(P1, data(y_2))=\text{Min}\{\text{distance}(P1, P2i)\}; \text{ for } i=1,2,\ldots, n, \tag{3.4}$$

i.e., the minimum distance between P1 and any point in $data(_2)$. The distance between two Pass Data Sets $data(y_1)$ and $data(_2)$ is given by:

$$\text{distance}(data(y_1), data(y_2))=\text{Max}\{\text{distance}(P1j, data(y_2))\}, \text{ for } j=1, 2, \ldots, m, \tag{3.5}$$

i.e., the maximum distance from any point in $data(y_1)$ to curve $data(y_2)$. The method of calculating the maximum and minimum number among a set of numbers will be familiar to those skilled in the art.

The following details one example of applying the Toleranced Digitizing method using a Line Digitizing Approach. Those skilled in the art will understand that the algorithm may easily be modified for a Rotational Digitizing Approach as well as other situations.

Figure 4:
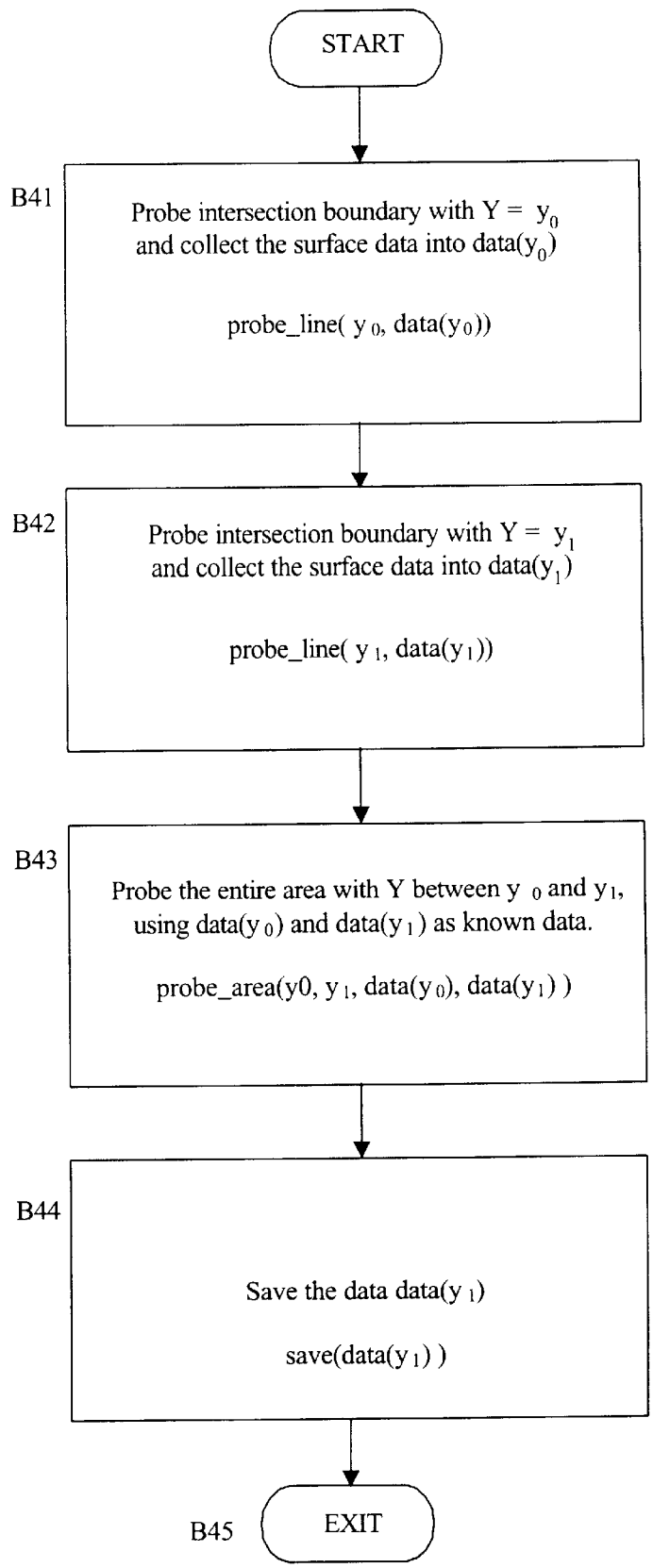
FIG. 4 shows an exemplary flow diagram detailing the Toleranced Digitizing method according to the present invention.

FIG. 4 illustrates an exemplary program according to the present invention for routing the probe to guarantee a Global Tolerance of E while digitizing an area y0 is less than or equal to Y and Y is less than or equal to y1. B41 in FIG. 4 digitizes the intersection boundary curve in the XZ plane with $Y=y_0$, where the points on the curve are collected and represented by $data(y_0)$. B42 digitizes the intersection boundary curve in the XZ plane with $Y=y_1$, where the points on the curve are collected and represented by $data(y_1)$. B43, $probe\_area(y_0, y_1, data(y_0), data(y_1))$ is a recursive procedure detailed below which essentially checks two conditions. First, it determines whether two Pass Data Sets $data(y_0)$ and $data(y_1)$ satisfy the allowable 3D distance condition (see B52 of FIG. 5) and if they do, indicates that the job is finished, saves the data and exits the procedure. Next, if the two Pass Data Sets do not satisfy the allowable 3D distance condition, B43 inserts more virtual intersection planes and digitizes more intersection boundary curves there between and save them, until the allowable distance condition is satisfied by all pairs of adjacent Pass Data Sets scanned (see B54–B57 of FIG. 5). B44 saves the Pass Data Sets associated with $Y=y_1$, represented as $data(y_1)$, into computer storage.

It may be necessary to repeatedly check whether the specified objective has been met, i.e., the allowable distance between two adjacent Pass Data Sets and the tolerance constraint between two adjacent virtual planes. If neither condition is met, then an additional intersection boundary curve is obtained half way between the first curve and the second curve. The new curve is then tested with the first curve to see if the specified objective has been met. This bisecting and testing procedure is repeated as needed until the objective is met. The new curve is then tested with the second curve to check whether the specified objective is met. Those familiar with the art of algorithm application are familiar with recursive procedures.

After the Data Gathering step is complete, the Digitizing Approach is implemented.

Figure 5:
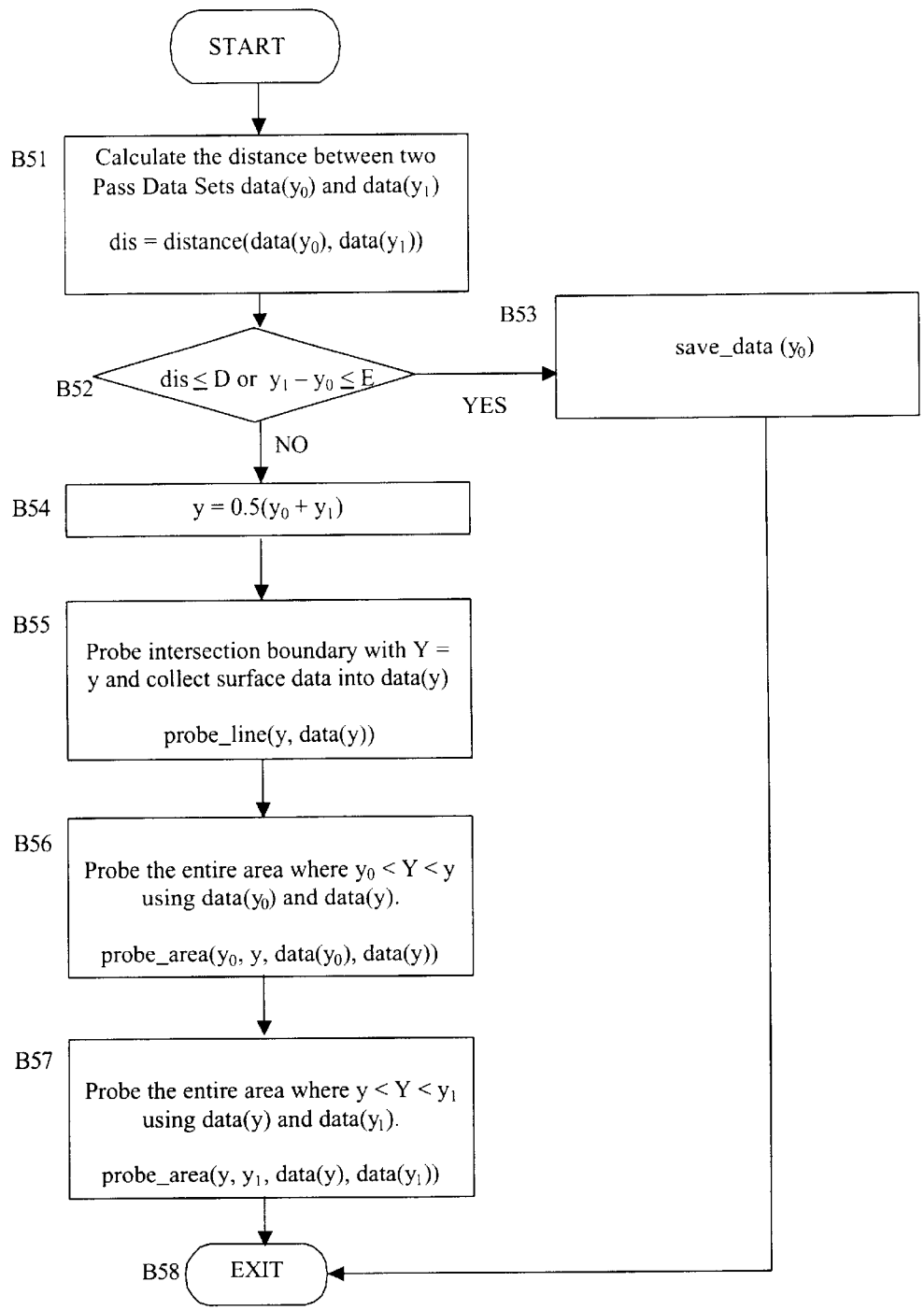
FIG. 5 shows an exemplary flow diagram detailing the recursive sub procedure used in the Toleranced Digitizing system according to the present invention.

FIG. 5 details a recursive procedure $probe\_area(y_0, y_1, data(y_0), data(y_1))$ that implements this recursive bisecting. At B51, the distance ("dis") between two Pass Data Sets $data(y_0)$ and $data(y_1)$ in 3D space is calculated as described by formulas (3.3), (3.4) and (3.5). At B52, dis is compared with D, the allowable distance. If dis is smaller than or equal to D, or $y_1-y_0$ is smaller than or equal to the tolerance number E, then $data(y_0)$ is saved at B53 and the procedure is exited at B58. Otherwise, the procedure continues to B54, where an intermediate value $y=0.5*(y_0+y_1)$ is calculated. At B55, the probe is controlled to digitize another intersection boundary curve in the XZ plane where Y-coordinates equal y and the curve digitized produces the Pass Data Set data(y). Now the original problem (i.e., the execution of Toleranced Digitizing in area y0 is less than or equal to Y and Y is less than or equal to y1) is divided into two similar but smaller problems. First, the execution of Toleranced Digitizing in the area y0 is less than or equal to Y and Y is less than or equal to y, and second, the execution of Toleranced Digitizing in the area y is less than or equal to Y and Y is less than or equal to y1. Therefore, at B56, $probe\_area(y_0, y, data(y_0), data(y))$ is called and at B57, $probe\_area(y, y_1, data(y), data(y_1))$ is called. The procedure $probe\_area(y_0, y_1, data(y_0), data(y_1))$ then exits at B58.

For example, assume that the model is a sphere centered at (0,0,0) with radius 0.75, a probe stylus having a radius 0.25, a digitizing area of −1 is less than or equal to X and X is less than or equal to 1, −1.1 is less than or equal to Y and Y is less than or equal to −0.9, and Z is greater than or equal to 0, and a Global Tolerance set to E=0.02. According to Formula (3.2), the allowable distance between the adjacent curves is:

$$D=\text{sqrt}(4*0.02*0.25-0.02*0.02)=0.14$$

Since the radius of the probe stylus is 0.25 and the radius of the spherical model is 0.75, the digitizing result is equivalent to a situation wherein a sphere of radius 1.0 is digitized with a zero radius probe stylus.

B41 of FIG. 4, executes procedure probe_line(-1.1, data(-1.1)). The model is not touched, therefore obtaining a straight line Z=0, saved and represented as data(-1.1). B42 executes procedure probe_line(-0.9, data(-0.9)), obtaining an arch of height 0.4359. Now at B43, the recursive procedure probe_area(-1.1. -0.9, data(-1.1), data(-0.9)) is entered. The detailed execution of this recursive procedure is shown as follows:

1. At B51, dis=0.4796 is calculated
2. At B52 : neither condition is satisfied, procedure proceeds to B54;
3. At B54 intermediate value y=-1.0000, is calculated;
4. At B55 probe_line(-1.0000, data(-1.0000)) is called, an intersection curve with Y coordinate=-1 is probed and surface data is collected and represented as data(-1), which is a straight line Z=0.0000;
5. At B56 probe_area(-1.1000, -1.0000, data(-1.1000), data(-1.0000)) is called, resulting
   5.1. At B51 dis=0.1000 is calculated;
   5.2. At B52 condition dis<=D is satisfied, procedure proceeds to B53;
   5.3. At B53, saves data(-1.1000);
   5.4. At B58, exits procedure probe_area(-1.1000, -1.0000, data(-1.1000), data(-1.0000));
6. At B57: probe_area(-1.0000, -0.9000, data(-1.0000), data(-0.9000)) is called, resulting
   6.1. At B51 dis=0.4472 is calculated
   6.2. At B52 neither condition is satisfied, procedure proceeds to B54;
   6.3. At B54 intermediate value y=-0.9500, is calculated;
   6.4. At B55 probe_line(-0.9500, data(-0.9500)) is called, a intersection curve with Y coordinate=-0.95 is probed and surface data is collected and represented as data(-0.9500) which is an arch of height 0.3122;
   6.5. At B56 procedure probe_area(-1.0000, -0.9500, data(-1.0000), data(-0.9500)) is called, resulting
      6.5.1. At B51 dis=0.3162 is calculated;
      6.5.2. At B52 neither condition is satisfied, procedure proceeds to B54;
      6.5.3. At B54 intermediate value y=-0.9750, is calculated;
      6.5.4. At B55: probe_line(_0.9750, data(-0.9750)) is called, an intersection curve with Y coordinate=-0.975 is probed and surface data is collected and represented as data(-0.975), which is an arch of height 0.2222;
      6.5.5. At B56 probe_area(-1.0000, -0.9750, data(-1.0000), data(-0.9750)) is called, resulting
         6.5.5.1. At B51 dis=0.2236 is calculated;
         6.5.5.2. At B52 neither condition is satisfied, procedure proceeds to B54;
         6.5.5.3. At B54 intermediate value y=-0.9875, is calculated;
         6.5.5.4. At B55 probe_line(_0.9875, data(-0.9875)) is called, an intersection curve with Y coordinate=-0.9875 is probed and surface data is collected and represented as data(-0.9875), which is an arch of height 0.1576;
         6.5.5.5. At B56 probe_area(-1.0000, -0.9875, data (-1.0000), data(-0.9875)) is called, resulting
            6.5.5.5.1. At B51 dis=0.1581 is calculated;
            6.5.5.5.2. At B52 condition y1-y0<E is satisfied, procedure proceeds to B53;
            6.5.5.5.3. At B53, saves data (-1.0000);
            6.5.5.5.4. At B58, exits probe_area(-1.0000, -0.9875, data(-1.0000), data(-0.9875));
         6.5.5.6. At B57 probe_area(-0.9875, -0.9750, data (-0.9875), data(-0.9750)) is called, resulting
            6.5.5.6.1. At B51 dis=0.0658 is calculated;
            6.5.5.6.2. At B52 condition y1-y0<E is satisfied, procedure proceeds to B53;
            6.5.5.6.3. At B53, saves data(-0.9875);
            6.5.5.6.4. At B58, exits probe_area(-0.9875, -0.9750, data(-0.9875), data(-0.975));
         6.5.5.7. At B58 exits probe_area(-1.0000, -0.9750, data(-1.0000), data(-0.9750));
      6.5.6. At B57 probe_area(-0.9750, -0.9500, data(-0.9750), data(-0.9500)) is called, resulting
         6.5.6.1. At B51 dis=0.0935 is calculated;
         6.5.6.2. At B52 condition dis<=D is satisfied, procedure proceeds to B53 and
         6.5.6.3. At B53, saves data(-0.9750),
         6.5.6.4. At B58 exits probe_area(-0.9750, -0.9500, data(-0.9750), data(-0.95));
      6.5.7. At B58 exits probe_area(-1.0000, -0.9500, data (-1.0000), data(-0.9500));
   6.6. At B57 probe_area(-0.9500, -0.9000, data(-0.9500), data(-0.9000)) is called, resulting
      6.6.1. At B51 dis=0.1334 is calculated;
      6.6.2. At B52 condition dis<=D is satisfied, procedure proceeds to B53;
      6.6.3. At B53, saves data(-0.9500),
      6.6.4. At B58, exits probe_area(-0.9500, -0.9000, data(-0.9500), data(-0.9));
   6.7. At B58 exits probe_area(-1.0000, -0.9000, data(-1.0000), data(-0.9));
7. At B58 exits probe_area(-1.1000, -0.9000, data(-1.1000), data(-0.9));

After exiting procedure probe_area(-1.1000, -0.9000, data (-1.1000), data(-0.9)), the routine returns to B44 in FIG. 4, saves data(-0.9000), and exits the whole program at B45.

The Pass Data Sets saved according to execution time is then:

data(-1.1000)
data(-1.0000)
data(-0.9875)
data(-0.9750)
data(-0.9500)
data(-0.9000)

The data order is consistent with the corresponding Y coordinates and is different from the order in which they were digitized. For all these adjacent pairs, either their distance in 3D space is bounded by D=0.14, or the distance between virtual intersection planes is bounded by E=0.02. If a CNC machine drives a spherical tool of radius 0.25 exactly according to these trajectories, the global tolerance will be within E=0.02, compared to the model (a sphere of radius 0.75) in the digitized area (-1.1≦Y≦-0.9).

Figure 6:
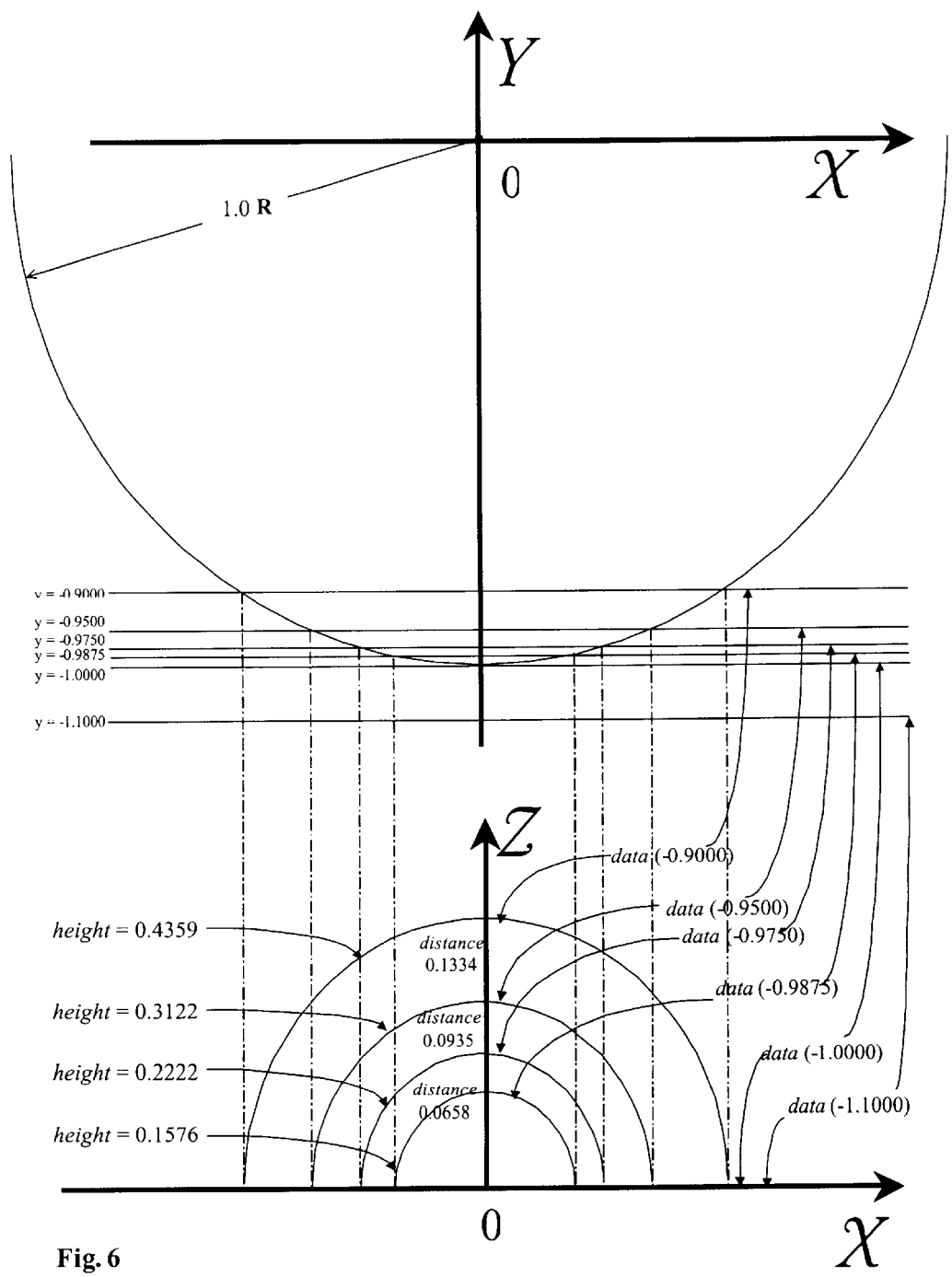
FIG. 6 is an exemplary illustration of the results of the Toleranced Digitizing method according to the present invention.

One may see that the probe trajectories shown in FIG. 6 are more evenly distributed in 3D space. Therefore, the predetermined tolerance is guaranteed. This method is not only useful for Line Digitizing, but also useful for Rotational Digitizing and other digitizing methods.

An advantage to the present invention is that the curves obtained from a Digitizing program will be evenly distributed. This signifies that the global tolerance of the digitizing system is guaranteed.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A method for collecting position data in a digitizing system, the digitizing system including a physical model and a digitizing head with a probe stylus, the stylus having a radius, the stylus being movable in a three-dimensional space along a surface of the physical model to collect the position data, the method comprising the steps of:

collecting first position data along a first curve comprising the intersection of a first plane with the surface of the physical model;

collecting second position data along a second curve comprising the intersection of a second plane, which is parallel to the first plane, with the surface of the physical model;

calculating a curve distance from point on the first curve to point on the second curve;

comparing the curve distance with an allowable distance;

if the curve distance is greater than the allowable distance, collecting third position data along a third curve comprising the intersection of a third plane with the surface of the physical model, said third plane located intermediate said first and second planes; and storing said first and second position data.

2. The method according to claim 1, further comprising the step of:

determining an allowable distance as a function of a predetermined tolerance number and a radius of the probe stylus.

3. The method according to claim 1, wherein a normal direction of the plane is parallel to Z-axis in the three-dimensional space.

4. The method according to claim 1, wherein a normal direction of the plane is perpendicular to Z-axis in the three dimensional space.

5. A computer-readable storage medium storing a set of instructions executable by a processor, the set of instructions for collecting position data in a digitizing system, the digitizing system including a physical model and a digitizing head with a probe stylus, the stylus having a radius, the stylus being movable in a three-dimensional space along curves on a surface of the physical model to collect the position data, wherein the set of instructions are adapted to perform the steps of the method of claim 1.

6. The method according to claim 1, wherein the curve distance is a maximum distance from any point on the first curve to the second curve.

7. The method according to claim 6, wherein a distance from a particular point to the second curve is a minimum distance from the particular point to any point on the second curve.

8. A method for digitizing a physical model using a movable probe, the method comprising the steps of:

selecting a tolerance;

collecting first points of a first curve at an intersection of the physical model and a first plane;

collecting second points of a second curve at an intersection of the physical model and a second plane, the second plane being parallel to the first plane;

determining if the first points and the second points meet the tolerance; and if the tolerance is not met, collecting third points of a third curve at an intersection of the physical model and a third plane, the third plane intermediate and parallel to the first and second planes.

9. The method of claim 8, further comprising the steps of:

repeating the determining step for the first points and the third points; and if the tolerance is not met in the repeated determining step, repeating the collecting step for the first and third points.

10. The method of claim 8, further comprising the steps of:

repeating the determining step for the second and third points; and if the tolerance is not met in the repeated determining step, repeating the collecting step for the second and third points.

11. The method of claim 8, wherein the third plane is equidistant between the first and second planes.

12. The method of claim 8, further comprising the step of:

determining the tolerance as a function of a tip radius of the movable probe and a maximum distance between the first curve and the second curve.

13. The method of claim 8, further comprising the step of:

storing coordinates of the first, second, and third points correlated respectively with a position of the first, second and third planes.

* * * * *